United States Patent [19]

Thompson

[11] Patent Number: 5,001,652

[45] Date of Patent: Mar. 19, 1991

[54] MEMORY ARBITRATION FOR VIDEO SUBSYSTEMS

[75] Inventor: Stephen P. Thompson, Boynton Beach, Fla.

[73] Assignee: International Business Machines Corporation, Armonk, N.Y.

[21] Appl. No.: 363,344

[22] Filed: Jun. 6, 1989

Related U.S. Application Data

[63] Continuation of Ser. No. 28,801, Mar. 20, 1987, abandoned.

[51] Int. Cl.[5] .......... G06F 15/62

[52] U.S. Cl. .......... 364/521; 364/518

[58] Field of Search .......... 364/518, 521; 340/749, 340/750

[56] References Cited

U.S. PATENT DOCUMENTS

| | | | |
|---|---|---|---|
| 4,117,469 | 9/1978 | Levine | 340/324 |
| 4,408,200 | 10/1983 | Bradley | 340/747 |
| 4,511,965 | 4/1985 | Rajaram | 364/200 |
| 4,577,344 | 1/1983 | Warren et al. | 382/1 |
| 4,580,135 | 4/1986 | Kummer et al. | 340/750 |
| 4,620,186 | 10/1986 | Krause et al. | 340/750 X |
| 4,688,190 | 8/1987 | Bechtolsheim | 340/750 X |

FOREIGN PATENT DOCUMENTS

| | | |
|---|---|---|
| 0182454 | 7/1985 | European Pat. Off. . |
| 8530522 | 5/1986 | European Pat. Off. . |
| 0241288 | 9/1987 | European Pat. Off. . |
| 59-71086 | 7/1984 | Japan . |
| 2112552 | 7/1983 | United Kingdom . |
| 2189632 | 10/1987 | United Kingdom . |

OTHER PUBLICATIONS

Electronic article: "Multi Port—Video Spiecher Für Schnellen Seriellen Zugriff", Nov. 30, 1984.

Article: Multi-Port-Video-Speicher fur schnellen seriallen Zugriff, Ray Pinkham, Elecktronik, 11/84, pp. 57-61.

*Primary Examiner*—Gary V. Harkcom

*Assistant Examiner*—Mark K. Zimmerman

*Attorney, Agent, or Firm*—George E. Grosser

[57] ABSTRACT

A video subsystem has a CRT (cathode ray tube) display, video controller and video memory for CRT data which requires access by the controller and a CPU (control processing unit). The subsystem monitors activity of the CRT screen display and the video controller and anytime CRT screen display is not required regardless of the time of occurrence, the CPU is allowed to have access to the video memory during the cycle or cycles in which such inactivity of display occurs. A guaranteed minimum number of cycles is assured for access of the video memory by the CPU using a fixed access sequence during the display periods of a high speed mode and shifting to an arbitration strategy to allow CPU access to occur during non-display times of the high speed mode so that the CPU can acquire more cycles to reduce any backlog of requests as necessary. In a low speed mode, the subsystem automatically changes strategy so that arbitration occurs both during display and non-display periods so that the CPU can acquire memory cycles on an as needed basis.

6 Claims, 15 Drawing Sheets

CPU INTERFACE AND DATA LATCH CONTROL

HIGH SPEED ARBITER CYCLE - CPU WRITE OPERATION

MEMORY ARBITRATION FOR VIDEO SUBSYSTEMS

This is a continuation of co-pending application Ser. No. 028,801, filed on Mar. 20, 1987, now abandoned.

BACKGROUND OF THE INVENTION

This invention relates to video subsystems for computers, such as personal computers, and more particularly to a more efficient arrangement of this nature having improved performance in relation to the control of arbitration and access to the memory of a subsystem of this nature The invention is described herein in connection with a personal computer system. Systems of this nature have been described heretofore which include a microprocessor interconnected with various Input/Output (I/O) and storage elements by way of a bus. A personal computer may also include I/O slots for insertion of adapter cards by the user.

For example the U.S. Pat. No. 4,408,200 describes a personal computer system comprising apparatus and method for writing text characters for a raster scan video display operated in an all-points-addressable, or graphics, mode, and for thereafter reading characters. A processor writes a character to the display by selecting and loading into a graphics video display buffer a text character dot pattern retrieved from storage, and reads a character previously written by comparing a dot pattern retrieved from the display buffer with dot patterns retrieved from main storage. Provision is made for color display as well. The system illustrates a display or graphics adapter comprising a video subsystem, the adapter being inserted in an I/O slot.

An enhanced video subsystem is described in U.S. Pat. No. 4,580,135 having a raster scan display that includes a plurality of storage maps. The maps are addressable in either of two modes to provide addresses and display of video information by the system The system represents an enhanced graphics system organization, sometimes referred to as an Enhanced Graphics Adapter (EGA). The video memory is time shared by multiplexing access of a CPU and a CRT controller. Although speciiic cycle details are not set forth, the Enhanced Graphics Adapter (EGA) Card provides dedicated cycles for accessing the memory by both the CRT controller and the CPU. The EGA has two arbitration modes, a speed mode and a high speed mode. In the high speed mode, the CPU always has 1 cycle out of every 5 cycles in which it can access the video memory; in the low speed mode, the CPU has 3 out of 5 cycles to access the video memory.

Other art especially concerns arbitration in video subsystems. For example, the U.S. Pat. No. 4,511,965 concerns a system for resolving the contention between the central processing unit (CPU) and a cathode ray tube (CRT) controller in accessing a video memory array, or video random access memory (RAM), of a data processing system. A CPU access period is provided between successive CRT controller access periods Arbitration logic is included to provide CRT controller access priority when there is contention between the CPU and the CRT controller. No mention is made of adapting the arbitration scheme to the CRT controller's activity.

As another example, U.S. Pat. No. 4,117,469 describes a computer terminal having a CRT display, a microprocessor, and a random access memory which stores character codes for information to be displayed on the CRT screen and which serves as working storage for the processor. The display processing is interleaved with other chores of the microprocessor.

As still another example, U.S. Pat. No. 4,577,344 discloses a system for processing video signals representing sensed images The video signals are fed through a multiplexer to a vision processor and a display. The video signals are preprocessed and stored in the vision processor which has a shared memory. A computer controller has access to the shared memory via a common bus and controls operation of the vision processor in response to command signals from peripheral devices.

A primary objective of the present invention is to enable more efficient and rapid utilization of a video memory in a Video Graphics Array (VGA) by a video controller and central processing unit, the VGA operating in a variety of display modes classified according to resolution; color; and attributes, such as intensity level change, reverse video, underline characters and the like.

SUMMARY OF THE INVENTION

As previously noted, the Enhanced Graphics Adapter (EGA) Card provides dedicated cycles for accessing the memory by both the video controller and the CPU. In both the high speed mode and the low speed mode, the CPL always has 1 cycle out of every 3 cycles in which it can access the video memory.

In accordance with the present invention, a guaranteed minimum number of cycles is assured for access of the video memory by the CPU during the high speed mode, but in addition, arbitration allows CPU access to occur during non-display times so that the CPU can acquire more cycles if necessary. In the low speed mode, arbitration occurs both during display and non-display periods so that the CPU can acquire memory cycles on an as needed basis.

In the practice of the present invention, a significant improvement in performance is realized by increasing the video memory bandwidth available to the CPU.

The Enhanced Graphics Adapter Card, previously noted, as well as the video subsystem described herein make use of at least one dynamic Random Access Memory (RAM) to store data to be displayed on a Cathode Ray Tube (CRT). The memory is continuously read by the video controller to update the screen. The host CPU is given access to this memory via dedicated memory cycles set aside for its use. A memory cycle arbiter is used to provide these dedicated CPU cycles while at the same time ensuring that data: is provided to the CRT controller at the required rate for proper screen refreshing. In the present invention, the design automatically (no software involvement) adjusts the arbitration rate to screen data requirements and gives the CPU maximum memory bandwidth during screen non-display time. The video arbiter monitors the activity of the screen display and the video controller and any time screen display is not required regardless of the time of occurrence, the CPU is allowed to have access to the video memory during the cycle or cycles in which such inactivity of display occurs.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings:

FIG. 2 shows the arbitration and memory cycle generation while

DETAILED DESCRIPTION

Figure 1A:
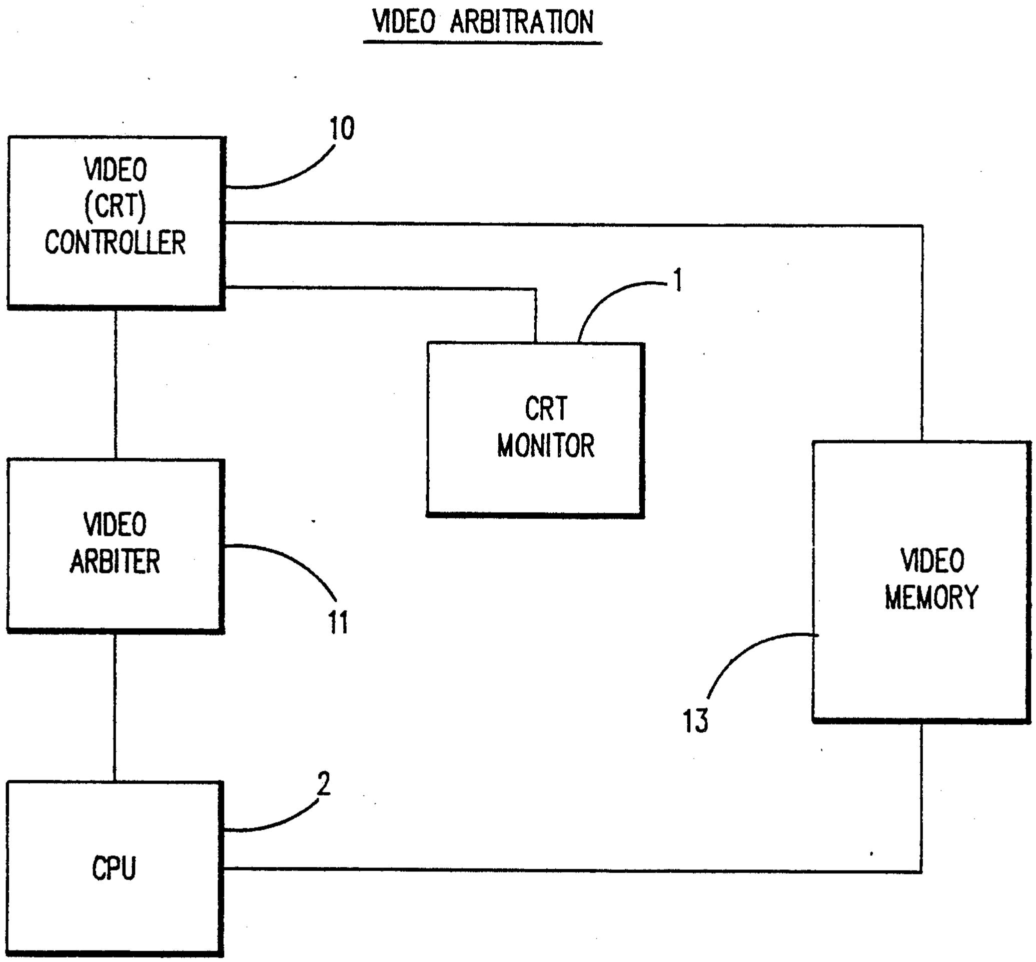
FIG. 1A is a generalized system block diagram of the video memory subsystem and arbitration apparatus described herein.

FIG. 1A illustrates the video memory subsystem and includes video memory 13 that stores the data for display on a CRT monitor 1. The video memory 13 is accessed by CPU 2 for writing and updating of the data and for reading the data on occasion, and is also accessible by video or CRT controller 10 for use in controlling the actual display on the monitor 1. Access of video memory 13 by CPU 2 and video controller 10 is controlled on a cyclical multiplexed bass by video (memory cycle) arbiter 11.

Figure 1B:
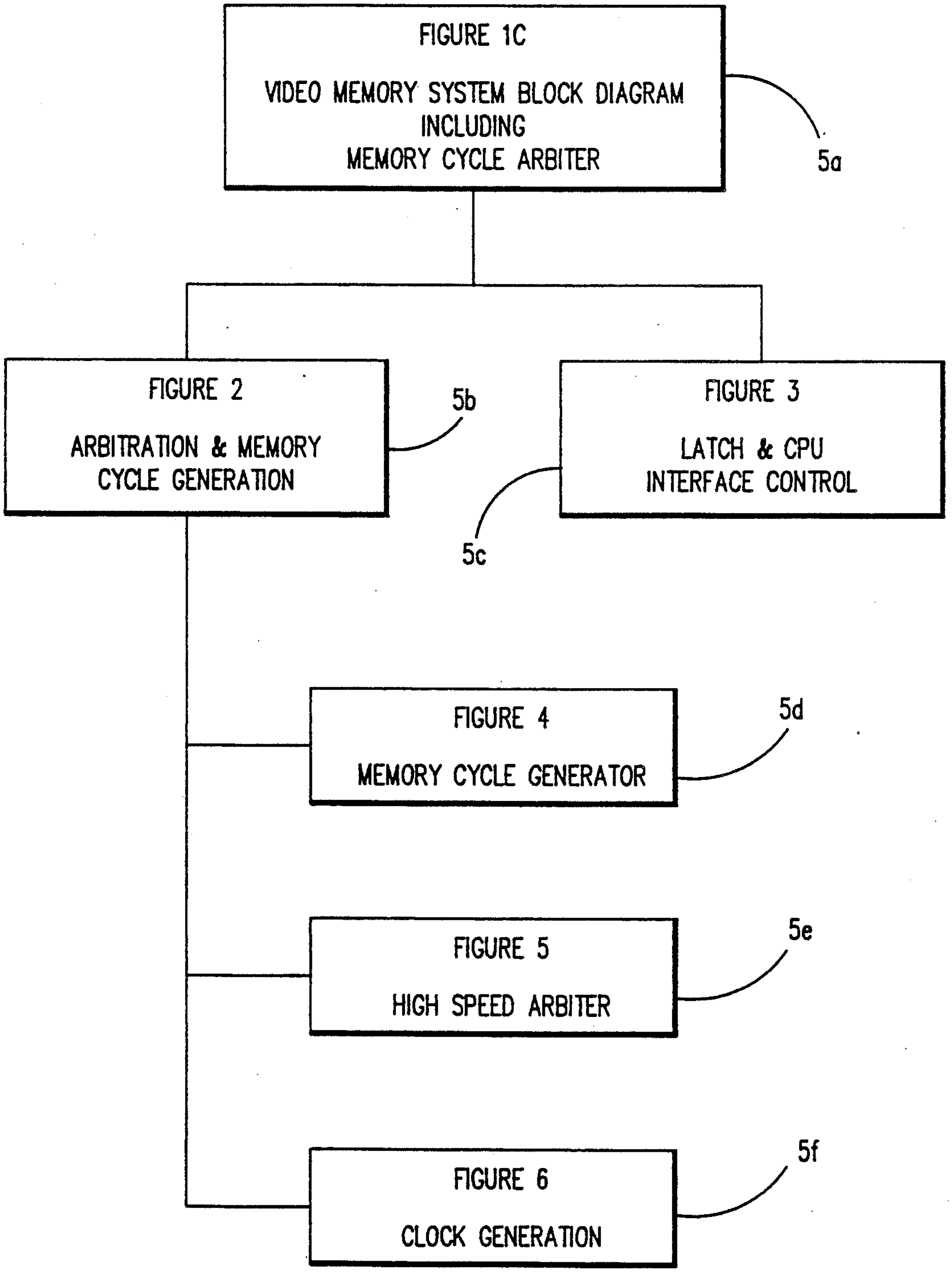
FIG. 1B shows interrelationship of various elements of the video subsystem of FIG. 1A with cross reference to other figures in the drawings.

FIG. 1B is arranged to show the interrelationship of the elements comprising the video subsystem with cross-reference to the other figures in the drawings. Included are blocks 5*a*–5*f* which represent FIG. 1C, and 2–6, respectively.

Figure 1C:
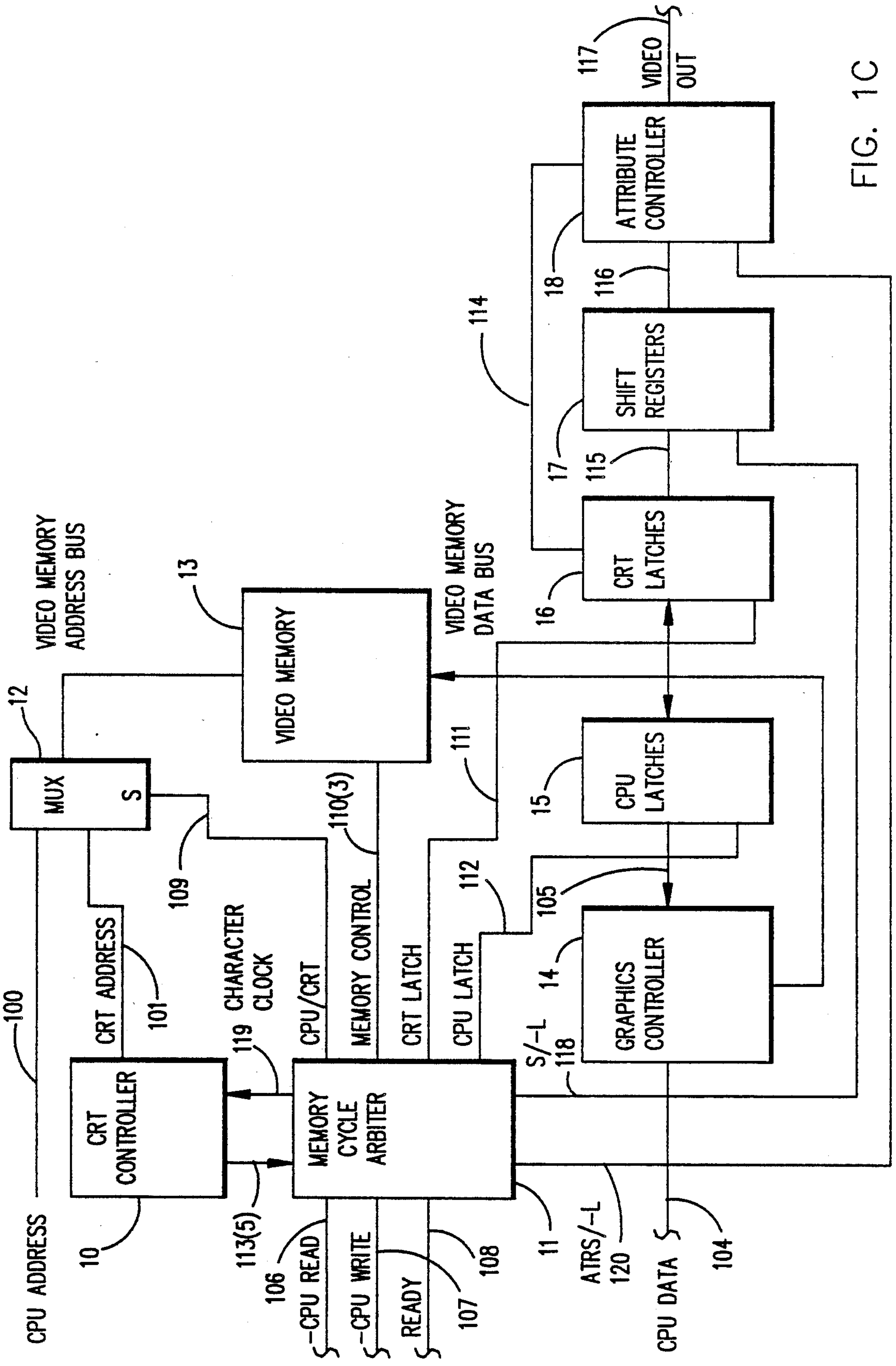
FIG. 1C is a more detailed block diagram of the video memory subsystem and arbitration apparatus of FIG. 1A.

FIG. 1C shows the video memory subsystem which includes a memory cycle arbiter 11. The memory cycle arbiter 11 provides control signals on lines 110 to the video memory 13, address selection control to multiplexor (MUX) 12 by the CPU/CRT signal on line 109, and data latch control by a CRT latch signal on line 111 and CPU LATCH signal on line 112. The -CPU READ signal on line 106 and -CPU WRITE signal on line 107 come from the CPU 2 and tell the video (memory cycle) arbiter 11 that the CPU wants to initiate a video memory 13 read or write operation. Arbiter 11 uses the READY signal on line 108 to tell the CPU when the requested cycle is completed.

When the CPU reads video memory 13, the CPU address signal on line 100 is coupled to the video memory address bus 102 via MUX 12. The CPU/CRT signal on line 109 selects which address input, CPU address 100 or CRT address 101, is presented on address bus 102. The video memory data on bus 103 is latched in the CPU latches 15 by CPU LATCH signal on line 12 and sent to the CPU via data bus 105, graphic controller 14, and CPU data bus 104. When the CPU writes to video memory 13, the CPU address signal on line 100 is coupled to the video memory address bus 102 via MUX 12. Write data from the CPU is sent to video memory 13 via CPU data bus 104, graphics controller 14, and data bus 103.

The CRT controller 10 generates the CRT screen address signal on line 101 which is sent via MUX 12 to address the video memory 13. CRT screen refresh data goes to the CRT latches 16 via data bus 103 and is latched by the CRT LATCH signal on line 111. Screen data in the CRT latches is sent to the attribute controller 18 via data bus 114; or via bus 115, shift registers 17, and bus 116. The attribute controller 18 formats the CRT data and sends it to the video display monitor via bus 117.

The video memory cycle) arbiter 11 decides whether the CRT controller 10 or the CPU 2 gets to use the video memory 13 at any given time. The CRT controller 10 needs to access the video memory 13 constantly during active video intervals to maintain the video image on the video display monitor. The data rate required to maintain the video image during active video intervals is determined by the operating mode of the video subsystem.

The video subsystem is capable of operating in many different modes, including alpha-numeric and graphics modes of several character or pixel resolutions. For example, the video subsystem can display 640 pixels horizontal by 200 lines vertical and 16 color graphics, and 640 pixels horizontal by 200 lines vertical and 2 color graphics. These constitute two of the many operating modes of the video subsystem and have different screen data rate requirements.

The memory cycle arbiter 11 senses the screen data rate required, and adjusts the memory cycle arbitration accordingly. The memory cycle arbiter 11 also adjusts the arbitration during times when the horizontal and vertical display enable signals are inactive to give the CPU all available cycles (except for memory refresh cycles) of video memory 13. Changing the arbitration during the non-display periods as well as during the retrace intervals instead of just during the retrace intervals alone as in the prior art allows for greater video memory 13 bandwidth to the CPU since the retrace intervals fall within the non-display intervals.

Figure 2:
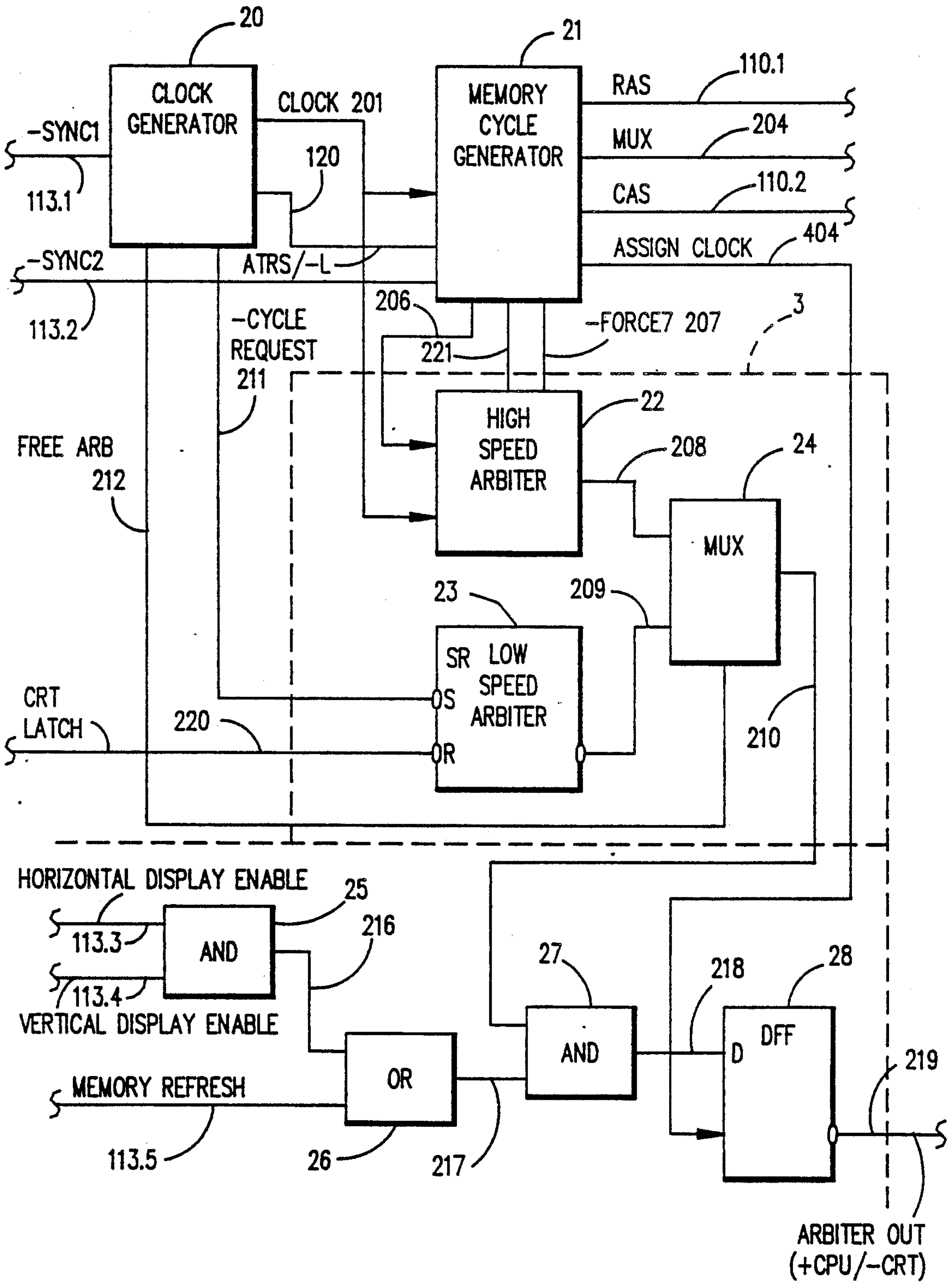
Figure 3:
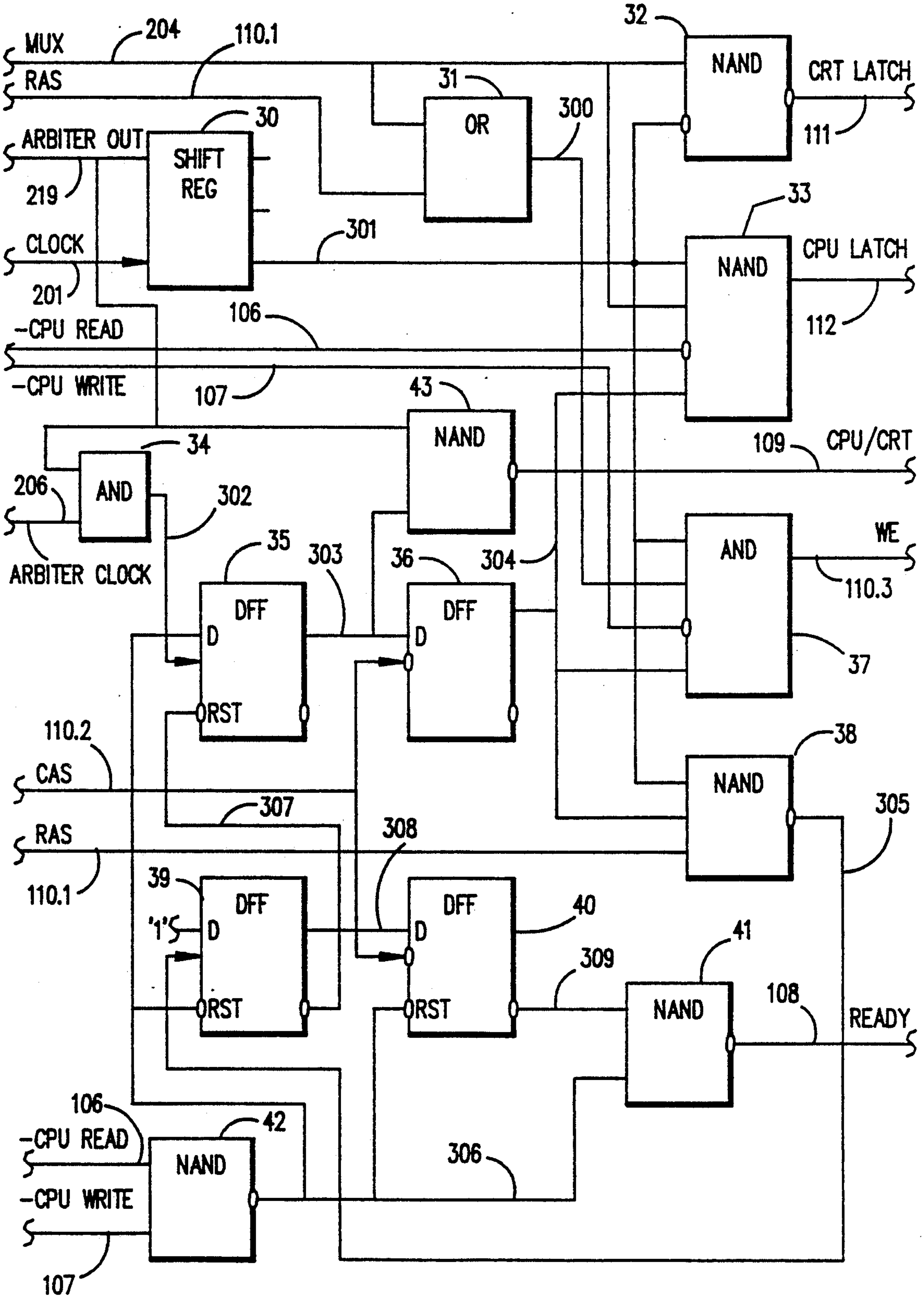
FIG. 3 shows CPU interface and data latch control logic.

FIGS. 2 and 3 form a more detailed block diagram of the memory cycle arbiter 11. FIG. 2 shows the arbitration and memory cycle generation logic, while FIG. 3 shows the CPU interface and data latch control logic. Referring to FIG. 2, the VGA arbiter consists of two main sections 3 and 4. The first is the 'Active Screen Time Arbiter' (ASTA) which makes memory cycle assignments based on the active display requirements. Blocks 22, 23, and 24, in FIG. 2 comprise this section. Block 22 is the high speed arbiter which is a fixed rate assignment type arbiter used in video modes which require high screen data rates. Block 23 is the low speed arbiter which is a simple SR latch that forms a request-/acknowledge type arbiter. Block 24 is the multiplexer that selects which arbiter is used to make the memory cycle assignments. The MUX is controlled by a select signal generated by logic that monitors the video operating mode to determine whether high or low speed arbitration is appropriate.

Figures 7A, 7B:
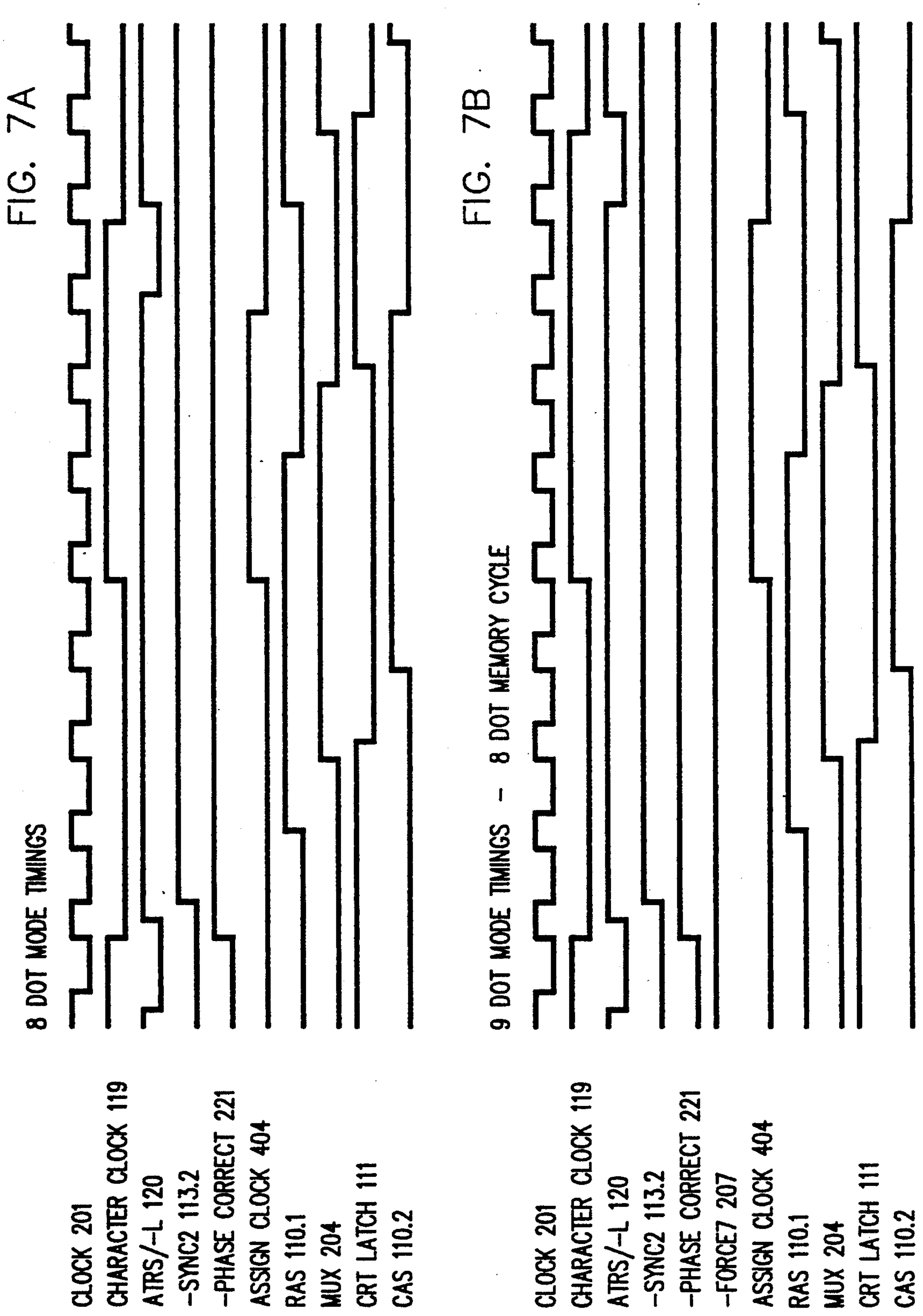
FIGS. 7A, 7B, and 7C illustrate waveforms for timings of 8 dot mode, 9 dot mode with 8 dot memory cycle and 9 dot mode with 7 dot memory cycle respectively.
Figure 7C:
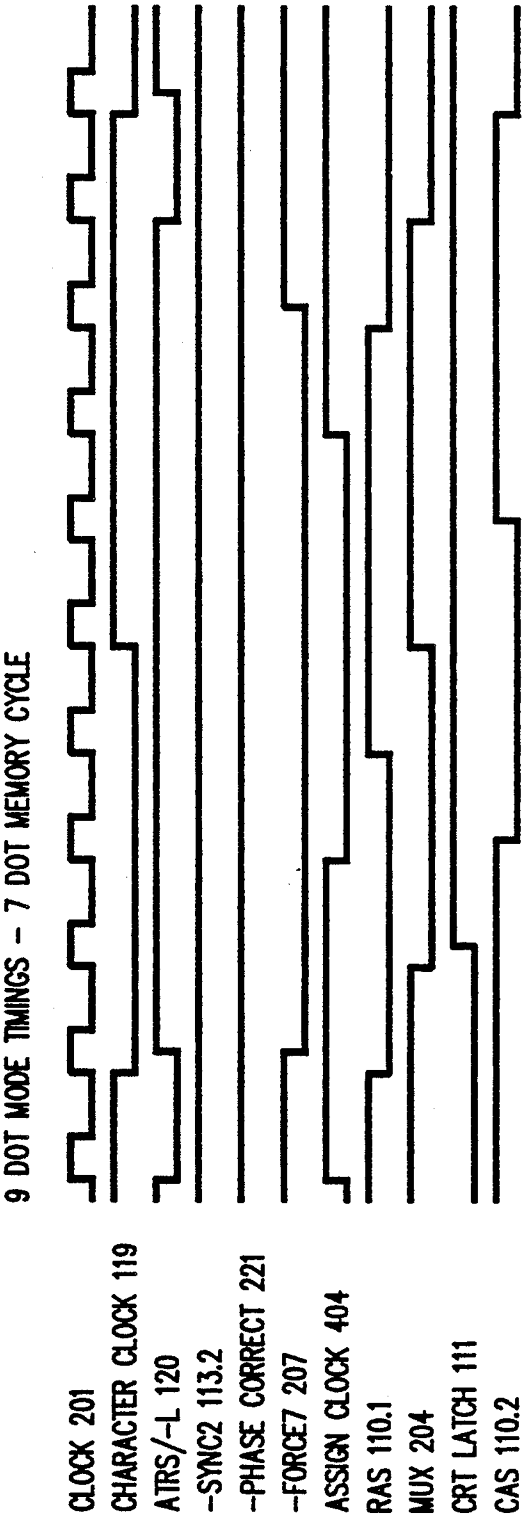
Figure 8A:
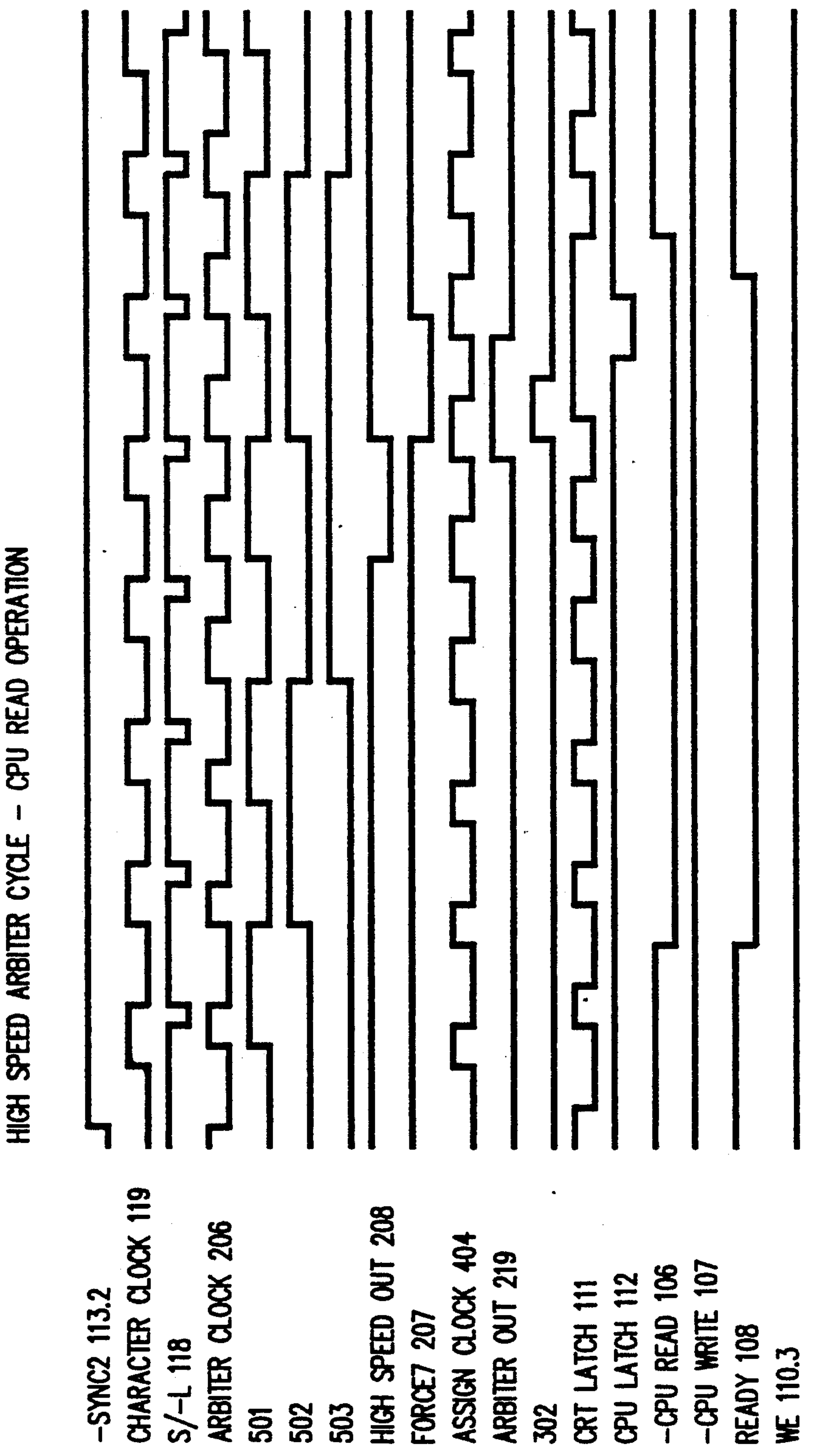
FIGS. 8A and 8B show waveforms occurring during high speed arbiter cycles for CPU Read and CPU Write, respectively.
Figure 8B:
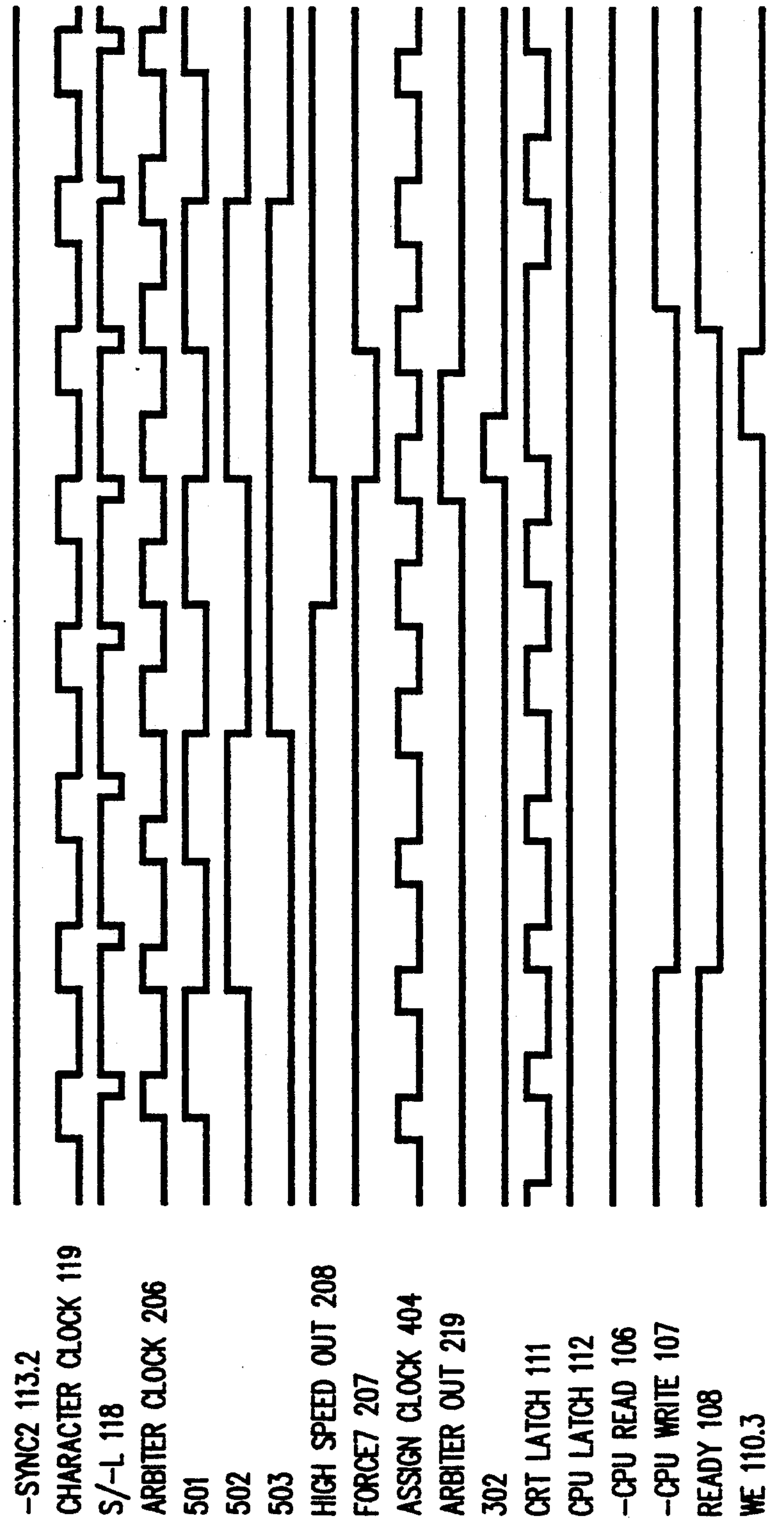
Figure 9A:
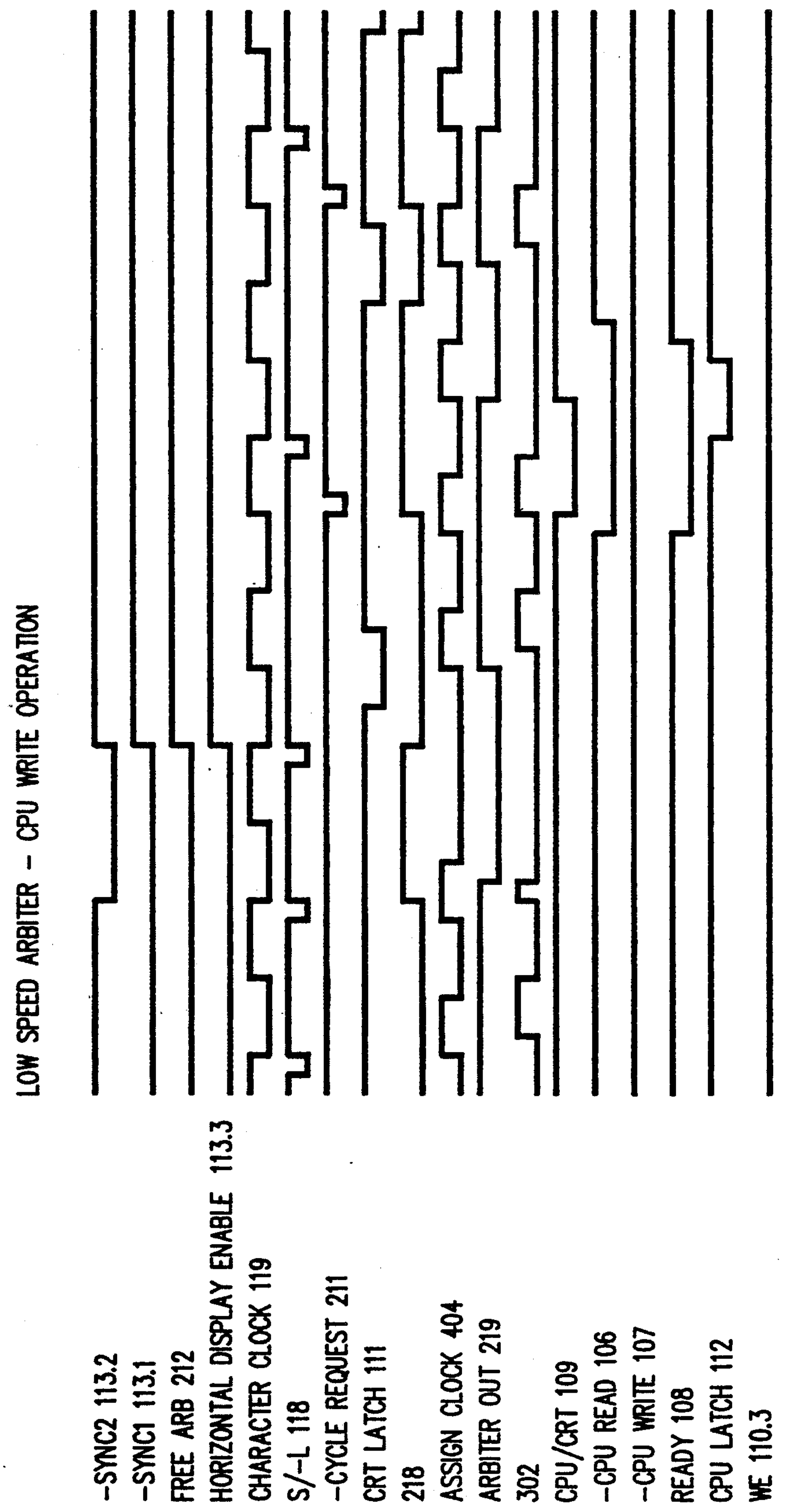
FIGS. 9A and 9B are waveform diagrams of low speed arbiter cycles for CPU Read and CPU Write respectively.
Figure 9B:
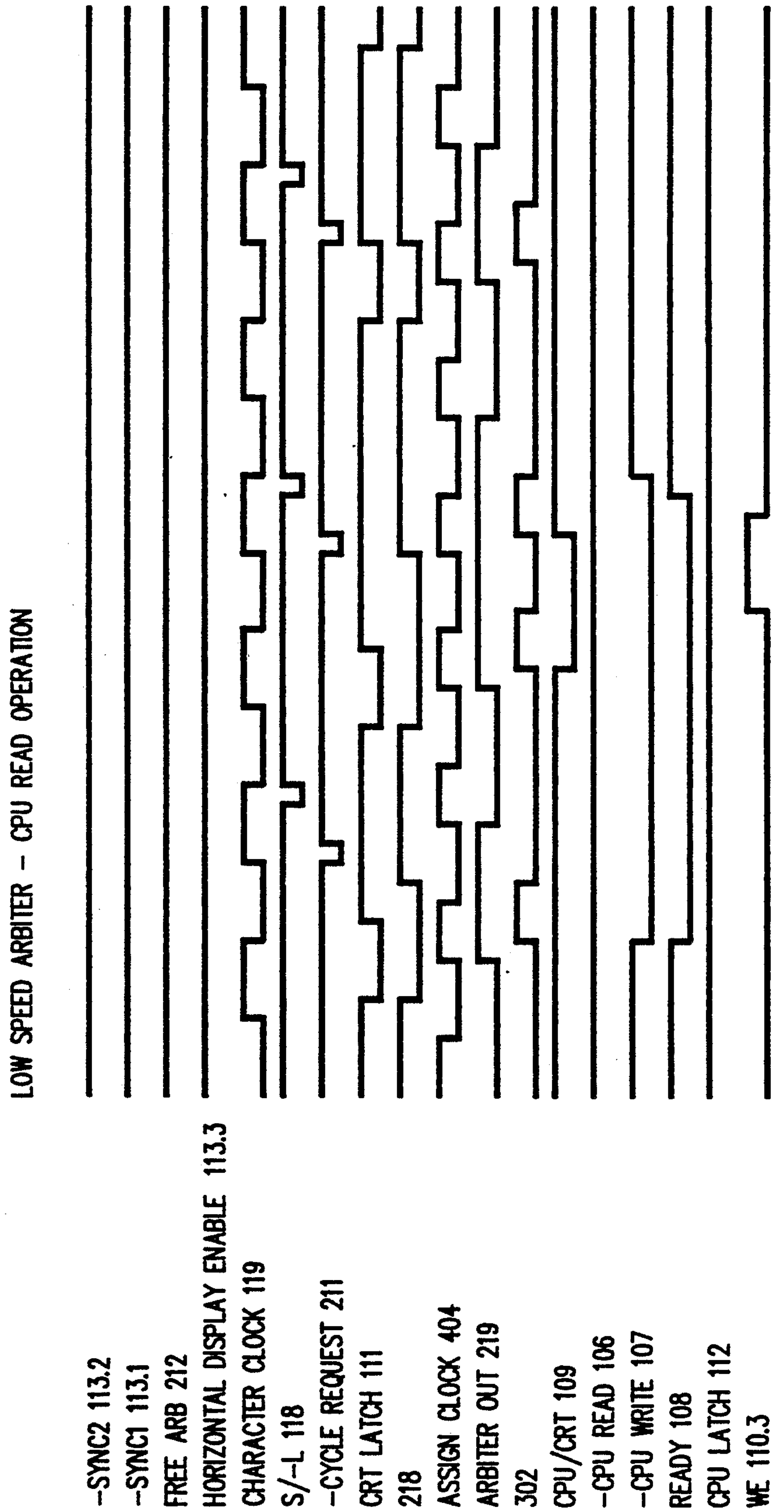

The output of the ASTA is fed to the 'Active/Inactive Screen Time Arbiter' (AISTA). This section monitors the horizontal and vertical display interval, block 25. If the screen is active, or if memory refresh is taking place, block 26, then the output of the ASTA is passed by clock 27 to the memory cycle assignment latch, block 28. Otherwise, the next memory cycle is earmarked for the CPU. Many of the signal waveforms and timing relationships are shown in FIG. 7A, 7B and 7C. Reference is also made to FIGS. 8A and 8B which illustrate signal waveforms and timing relationships during high speed arbiter cycles (high speed mode) for CPU Read and CPU Write respectively. Other signal waveforms of interest for low speed mode are shown in FIG. 9A, CPU Read operation and FIG. 9B, CPU Write operation.

The ARBITER OUT signal on line 219, FIG. 2, is generated by a D type flip-flop 28 clocked by an ASSIGN CLOCK signal on line 404. The data input of DFF 28 is the NEXT ARB STATE signal on line 218. The NEXT ARB STATE signal on line 218 will reflect the ACTIVE SCREEN ARB OUT signal on line 210 if the HORIZONTAL DISPLAY ENABLE signal on line 113.3 and the VERTICAL DISPLAY ENABLE signal on line 113.4 are active, or if MEMORY REFRESH signal on line 113.5 is active AND circuit 25, OR circuit 26, and AND circuit 27 perform this function. The HORIZONTAL DISPLAY ENABLE signal on line 113.3 and the VERTICAL DISPLAY ENABLE signal on line 113.4 are customarily furnished in an adapter such as the aforementioned Enhanced Graphics Adapter. The MEMORY REFRESH signal on line 113.5 is the same frequency as HORIZONTAL DISPLAY ENABLE 11.3 and is a positive logic pulse 3 or 5 character times long, occurring 1 character time after HORIZONTAL DISPLAY ENABLE 113.3 goes from logical one to logical zero. The ACTIVE SCREEN ARB OUT signal on line 210 is used when the CRT screen is in an active display interval. ACTIVE SCREEN ARB OUT signal on line 210 will reflect the high speed arbiter 22 output 208, or the low speed arbiter 23 output 209, depending on the status of multiplexer 24 control FREE ARB signal on line 212 from clock generator 20. Clock generator 20 senses the data rate requirements of the selected video mode and automatically determines whether high speed arbiter 22 or low speed arbiter 23 is appropriate for memory cycle assignment.

The low speed arbiter 23 is a simple Set-Reset (S-R) latch that operates as a request-acknowledge type arbiter. The request, or S input is the -CYCLE REQUEST signal on line 211 generated by clock generator 20. The acknowledge, or R input is the CRT LATCH signal on line 220. The CRT LATCH signal on line 220 is used in FIG. 1C as a data latch strobe that latches the video memory 13 data.

Figure 5:
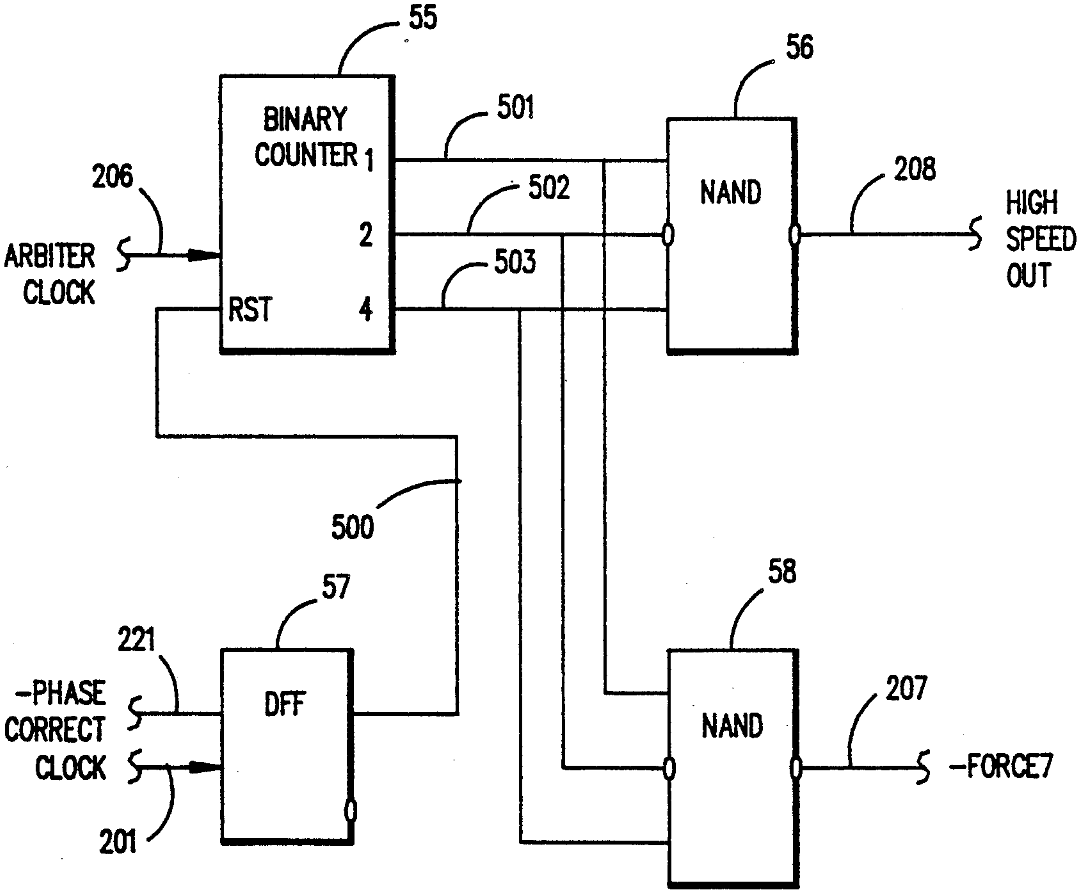
FIG. 5 illustrates the logical construction of the high speed arbiter.

The high speed arbiter 22 is an assignment type arbiter whose logical construction is shown in FIG. 5. In FIG. 5, high speed arbiter 22 consists of binary counter 55, D flip-flop 57, and NAND gates 56 and 58. ARBITER CLOCK signal on line 206 is generated by memory cycle generator 21 and is used to clock binary counter 55. NAND gate 56 generates the high speed arbiter 22 output signal on line 208. NAND gate 56 drives the HIGH SPEED OUT 208 signal to logical zero (CPU cycle) each time the binary count in counter 55 is equal to five. NAND gate 58 drives the -FORCE7 signal on line 207 low whenever the binary count in counter 55 is equal to six. The -FORCE7 signal on line 207 is used to re-synchronize memory cycle generator 21 after ever 8th memory cycle in video modes that use 9 input clock periods for each character position on the screen, as in FIGS. 7B and 7C. In video modes that use 8 input clock periods for each character, as in FIG. 7A, this signal is ignored. The D flip-flop (DFF) 57 is used to provide noise immunity for the PHASE CORRECT signal on line 221 that synchronizes the binary counter to the start of a horizontal scan line.

Figure 4:
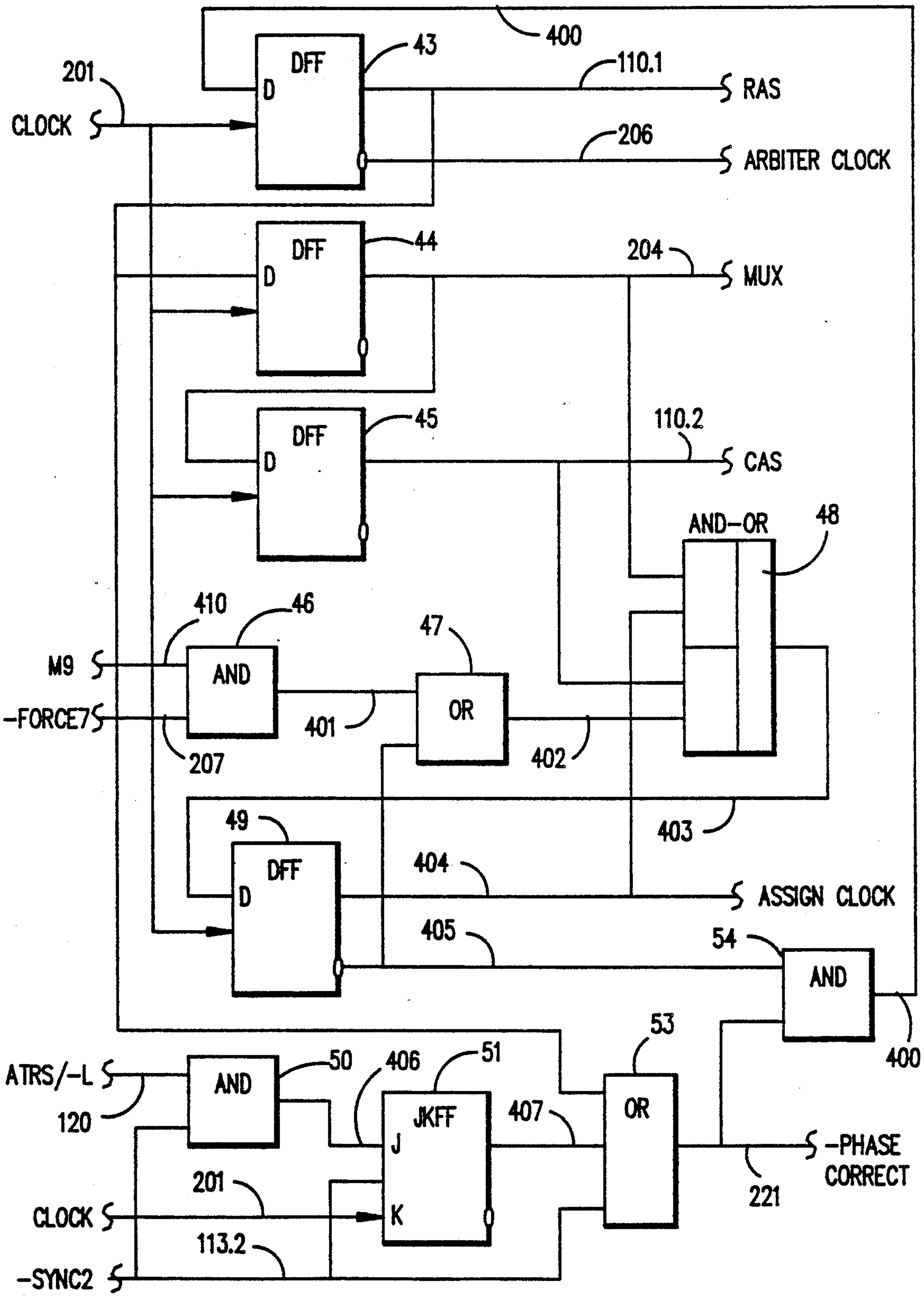
FIG. 4 illustrates the logical construction of the memory cycle generator of the video subsystem.

Referring again to FIG. 2, memory cycle generator 21 generates the control signals for video memory 13 as well as clocks for high speed arbiter 22 and arbiter output flip-flop (DFF) 28. FIG. 4 illustrates the logical construction of memory cycle generator 21. D flip-flops (DFF) 43, 44, 45, and 49 make up a shift register whose output is fed back to its input via line 400. The RAS signal on line 110.1, MUX signal on line 204, and CAS signal on line 110.2 are active high pulses that are shifted in phase by one input clock period each. RAS signal on line 110.1 and CAS signal on line 110.2 are provided via the MEMORY CONTROL bus 110 of FIG. 1. The AND-OR block 48 is used to force the shift register feedback cycle to seven (7) input clocks by selecting the third flip-flop stage (DFF 45) output during the first half of the feedback cycle, and by selecting the second flip-flop stage (DFF 44) during the second half of the feedback cycle. The AND circuit 46 and OR circuit 47 are used to force the feedback cycle to 8 input clocks during modes that use 9 clock periods for a single character position on the CRT screen. The M9 signal on line 410 is a single bit output of a software programmable register that tells the video hardware to make the character box 9 clocks long. The -FORCE7 signal on line 207 is generated by high speed arbiter 22 and forces one 7 clock feedback cycle once every 8 feedback cycles. This is done to realign the generated memory cycles and high speed arbiter 22 with the S/-L signal on line 118, FIG. 1C, that controls the video output shift registers 17.

The -PHASE CORRECT signal on line 221 is used to synchronize the memory cycle generation logic and high speed arbiter 22 to the beginning of a horizontal scan line on the CRT screen. AND circuit 54 allows the -PHASE CORRECT signal on line 221 to prevent the memory cycle shift register from starting a new cycle by interrupting the feedback loop on line 400. The memory cycle shift register is idle (all DFF's reset) while the -PHASE CORRECT signal on line 221 is active The -SYNC2 signal on line 113.2 is generated by the CRT controller 10, FIG. 1C, and indicates the character position just prior to the start of the horizontal scan line. The ATRS/-L signal on line 120 is a signal used to control data within attribute controller 18, FIG. 1C. The timing of -PHASE CORRECT signal on line 221 is precisely controlled by NOR circuit 50, JK flip-flop 51, and OR circuit 53; and is a derivative of the ATRS/-L signal on line 120 and -SYNC2 signal on line 113.2. Precise phase control of the -PHASE CORRECT signal on line 221 provides immunity to signal propagation delay variations from chip to chip which are inherent in the IC manufacturing process.

The initial state of the control logic with -SYNC2 signal on line 113.2 high will be JK flip-flop 51 reset (signal on line 407 low) and -PHASE CORRECT signal on line 221 high. When -SYNC2 signal on line 113.2 goes low, OR circuit 53 drives -PHASE CORRECT signal on line 221 low when the memory cycle shift register enters the second half cycle of operation (as indicated by RAS signal on line 110.1 being low). With -PHASE CORRECT signal on line 221 active, the memory cycle shift register is free to finish the current memory cycle, but is not allowed to begin another one. The circuit will remain in this state until the ATRS/-L signal on line 120 signal goes low, signifying along with -SYNC2 signal on line 113.2 being low that the CRT horizontal scan line will begin with the next clock cycle. At this point NOR circuit 50 output 406 goes high and JK flip-flop 51 output 407 will go high at the next CLOCK signal on line 201, forcing -PHASE CORRECT signal on line 221 inactive. The circuit will remain in this state until -SYNC2 signal on line 113.2 goes high, holding -PHASE CORRECT signal on line 221 inactive and resetting JK flip-flop 51.

Figure 6:
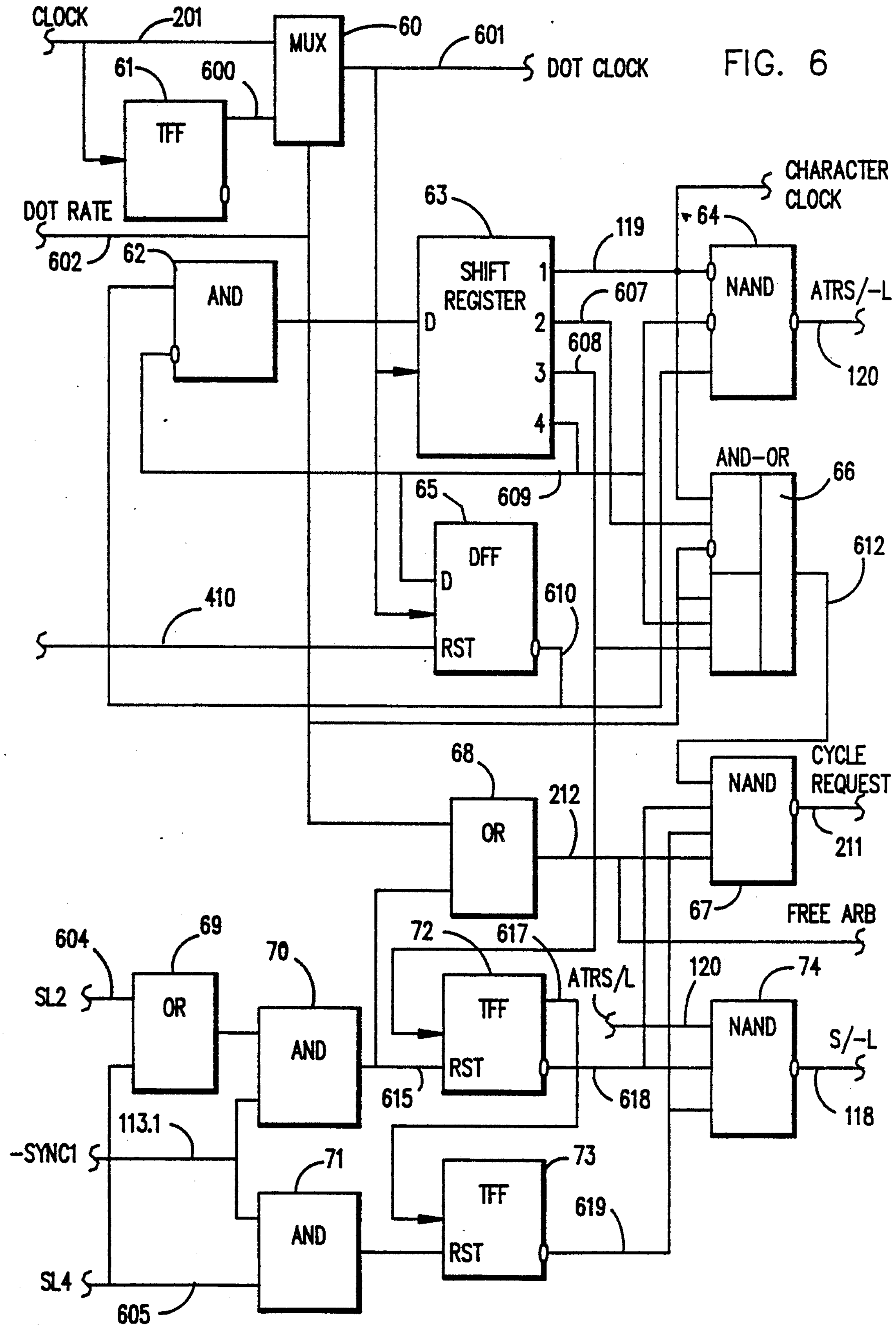
FIG. 6 illustrates the logical construction of the clock generator.

The internal operation of clock generator 20 is shown in FIG. 6. A master clock signal on line 201 drives toggle flip-flop (TFF) 61 and one of the inputs to MUX block 60. Toggle flip-flop 61 divides the master clock 201 frequency by 2 and presents the result to the other input of MUX 60 via line 600. The DOT RATE signal on line 602 signal is a single bit output of a software programmable register that tells the clock generator what clock frequency to use for the video dot rate.

The output of MUX block 60 becomes the DOT CLOCK signal on line 601. DOT CLOCK signal on line 601 is used as &he clock for a shift register circuit made up of shift register block 63 and D flip-flop (DFF) 65. This shift register operates in the same manner as the shift register in memory cycle generator 21, FIG. 4. The AND circuit 62 provides the feedback for the shift register loop. The shift register will have an 8 or 9 DOT CLOCK cycle length on line 601 depending on the state of th M9 signal on line 410. When M9 on line 410 is logical 1 (9 dot mode selected), D flip-flop 65 inserts an extra DOT CLOCK period via line 601 during the second half of the shift register feedback cycle. The -CHARACTER CLOCK signal on line 119 is the clock used to clock the CRT controller 10 of FIG. 1C. Signals on lines 607, 608, 609, and 610 (in 9 dot modes) will all look like -CHARACTER CLOCK signals on line 119, but will be phase shifted by one DOT CLOCK (line 601) period each.

The ATRS/-L signal on line 120 is used by the Attribute controller 18 in FIG. 1C and is generated by NAND block 64. The -CHARACTER CLOCK signal on line 119, and signals 609 and 610 are the inputs to NAND block 64. The timing of ATRS/-L signal on line 120 is shown in FIG. 7A, 7B, and 7C. The -CYCLE REQUEST signal on line 211 is used to tell the low speed arbiter 23 that a CRT memory cycle needs to be performed. The -CYCLE REQUEST signal on line 211 is generated by NAND block 67. The output of OR circuit 68 (signal on line 212) serves as an enable for the -CYCLE REQUEST signal. The -CYCLE REQUEST signal on line 211 will be generated if the FREE ARB signal on line 212 signal is active, that is, if DOT CLOCK frequency (line 601) selected is the master CLOCK 201 divided by 2, or if the shift registers 17 in FIG. 1C are programmed in a multiple shift mode of operation as signified by the signal on line 615 being logical 1.

Multiple shift mode means that video memory 13 data need not be strobed into CRT latches 16, FIG. 1C, for every cycle of -CHARACTER CLOCK signal on line 119. Available modes are latching video memory 13 data every 2 or 4 cycles of -CHARACTER CLOCK 119.

Signals on lines 618 and 619 are used in the multiple shift modes as secondary enables that allow -CYCLE REQUEST (line 211) to be activated once ever 2 or 4 cycles of -CHARACTER CLOCK signal on line 119. AND-OR block 66 generates a signal on line 612 which is the final output of NAND block 67. The signal on line 612 is generated once ever -CHARACTER CLOCK (line 119) cycle in one of two DOT CLOCK (line 601) positions. Which DOT CLOCK position is used depends on whether the DOT CLOCK frequency is equal to CLOCK signal on line 201 or CLOCK signal on line 201 divided by 2. The DOT RATE signal on line 602 selects which AND portion of AND-OR block 66 is responsible for selecting the DOT CLOCK position.

In modes where DOT CLOCK signal on line 601 is the same frequency as CLOCK signal on line 201, the signal on line 612 is the logical AND of -CHARACTER CLOCK signal on line 119 and the signal on line 607. In modes where DOT CLOCK 601 is half the frequency of CLOCK 201, the signal on line 612 is the logical AND of signals on lines 608 and 609.

The purpose for varying the position of signal 612, and therefore -CYCLE REQUEST on line 211, in the high and low dot rates is to position the arbitered CRT memory cycles such that there are two or more memory cycles available for the CPU between each CRT cycle. This prevents the CRT cycles from bunching up and requiring the CPU to wait longer at any given instant of time for an available memory cycle.

The S/-L signal on line 118 controls the load and shift operation of the video shift registers 17 of FIG. 1C The S/-L 118 signal on line 118 is generated by NAND block 74 and uses ATRS/-L signal on line 120 as one of its inputs. The other two inputs are signals on lines 618 and 619 which serve as enables that allow S/-L signals on line 118 to happen as ATRS/-L signals on line 120 once every 1, 2, or 4 -CHARACTER CLOCK 119 cycles. Signals on lines 618 and 619 are generated by toggle flip-flops (TFF) 72 and 73 which are configured as a two bit ripple counter clocked by the signal on line 608. The signal on line 608 is chosen as a clock to allow time for the outputs of the flip-flops to stabilize before ATRS/-L signal on line 120 changes. The OR circuit 69, AND circuit 70, and AND circuit 71 are used to control the operation of the flip-flops. With -SYNCl signal on line 113.1 low, the flip-flops are held reset and the S/-L signal on line 118 looks identical to the ATRS/-L signal on line 120. The -SYNCl signal on line 113.1 is generated by CRT controller 10 in FIG. 1C and synchronizes the two bit counter to the start of a horizontal scan line on the display monitor. -SYNCl 113.1 is similar to the HORIZONTAL DISPLAY ENABLE signal on line 113.3. When -SYNCl signal on line 113.1 is high, SL2 signal on line 604 and SL4 signal on line 605 control flip-flops 72 and 73. The SL2 signal on line 604 and SL4 signal on line 605 are single bit outputs of a software programmable register. If the SL2 signal on line 604 is logical one, then flip-flop 72 is allowed to toggle with the signal on line 608, causing S/-L signal on line 118 to occur once every two of the -CHARACTER CLOCK signals on line 119. If the SL4 signal on line 605 is logical one then flip-flops 72 and 73 are both allowed to toggle, causing the S/-L signal on line 118 to occur once every four -CHARACTER CLOCK cycles (line 119).

FIG. 3 shows the logic that makes up the latch interface control section of the memory cycle arbiter 11. The signal CRT LATCH on line 111 is generated by NAND block 32 which has inputs MUX on line 204 and a signal on line 301 which is the output of shift register 30. The MUX signal on line 204 controls the shape and timing of CRT LATCH signal on line 111, while the signal on line 301 is an enable signal that is derived from the ARBITER OUT signal on line 219 delayed by three CLOCK (line 201) periods. In a similar manner, CPU LATCH signal on line 112 is generated by NAND block 33. The inputs of NAND 33 are fed by MUX signal on line 204 and the signal on line 301, as well as -CPU READ signal on line 106 and the signal on line 304. The -CPU READ signal on line 106 is a control signal from the CPU 2 that indicates the CPU 2 wants to read video memory 13. The signal on line 304 is the output of D flip-flop 36 and indicates that the current video memory 13 cycle is actually being used by the CPU. CPU/CRT signal on line 109, used in FIG. 1C to control MUX block 12, is generated by NAND block 43.

If the current memory cycle is arbited to the CPU (ARBITER OUT on line 219 high) and if the CPU is actually using the cycle (signal on line 303 high) then CPU/CRT signal on line 109 will be low selecting the CPU address input of MUX block 12. The WE signal on line 110.3 is a control signal to video memory 13 that indicates a Write operation. The WE signal on line 110.3 is generated by AND circuit 37 which has as inputs a signal on line 304, -CPU WRITE signal on line 107, and the signal on line 301 all of which are enable signals, and a signal on line 300 which controls the shape and timing of the WE signal on line 110.3. Signals on lines 301 and 304 are as described above, while -CPU WRITE signal on line 107 is a control signal from the CPU that indicates that the CPU wants to write to video memory 13. The signal on line 300 is the logical OR of MUX signal on line 110.3 as seen by video memory 13 will go active at RAS signal on line 110.1 time, and inactive one CLOCK (line 201) cycle before CAS signal on line 110.2 goes inactive. This timing for WE signal on line 110.3 meets a video memory 13 dynamic RAM specification for an early write cycle.

READY signal on line 108 is generated by NAND block 41 as follows. In the inactive state where -CPU READ signal on line 106 and -CPU WRITE signal on line 107 are inactive (high), NAND block 42 drives the signal on line 306 low, resetting D flip flops 39 and 40, and holding READY signal on line 108 active (high). When the CPU requests a video memory 13 cycle by activating -CPU READ signal on line 106 or -CPU WRITE signal on line 107, the signal on line 306 will go high and READY signal on line 108 will go inactive (low). The CPU will maintain the current states of -CPU READ signal on line 106 and -CPU WRITE signal on line 107 until after READY signal on line 108 goes high again. The logical 1 state of the signal 306 will be latched into D flip-flop 35 by the signal on line 302 which is the AND of ARBITER OUT signal on line 219 and ARBITER CLOCK signal on line 206. The AND circuit 34 performs this function The signal on line 302 is a clock that occurs when the next video memory 13 cycle is available to the CPU. The output of D flip-flop 35 is presented as data to D flip-flop 36. The trailing edge of CAS signal on line 110.2 indicates the end of the current video memory 13 cycle and is used to strobe this data into D flip-flop 36, forming the signal on line 304, which when high indicates that the new current video memory 13 cycle is being used by the CPU. The NAND block 38 uses signals on lines 304 and 301 to enable RAS signal on line 110.1 as a clock to D flip-flop 39. The trailing edge of RAS signal on line 110.1 of the CPU video memory 13 cycle latches a logical 1 into D flip-flop 39. The signal on line 307 goes low resetting D flip-flop 35 and signal 308 goes high. The trailing edge of CAS 110.2 clocks the high state of signal 308 into D flip-flop 40, driving signal 309 low, and READY signal on line 108 high indicating to the CPU that the video memory 13 cycle is completed. The trailing edge of CAS signal on line 110.2 will also clock the low state of D flip-flop 35 output into D flip-flop 36 thereby driving the signal on line 304 low. The circuit will remain in this state until -CPU READ signal on line 106 or -CPU WRITE signal on line 107 are both high again. At this point NAND block 42 will drive the signal on line 306 low again, resetting D flip-flops 39 and 40, and holding READY signal on line 108 high through NAND 41. The circuit will remain in this state until the CPU again activates -CPU READ signal on line 106 or -CPU WRITE signal on line 107. Thus, the video arbiter monitors the state of screen display and when it is determined that the screen display will not be active, the CPU is enabled to have the cycle or cycles in which the screen display is not active.

While a preferred embodiment of the invention has been illustrated and described, it is to be understood that there is no intention to limit the invention to the precise construction herein disclosed and the right is reserved to all changes and modification coming within the scope of the invention as defined in the appended claims.

What is claimed is:

1. For use in a computer system having a display for video data;

a display controller which (1) has at lest two alternative selectable modes of operation corresponding to respective video data rates for said display, (2) produces a clock signal to define time intervals for video data access operations, (3) produces a display request signal to request video data for said display and (4) produces video enable signals which define time periods during which video data must be supplied to said display at a video data rate corresponding to the selected mode:

a memory responsive to request signals received said memory access controller, which is adapted to store video data and is connected for transmitting such data to said display, said memory having regular access intervals defined by said clock signal; and a processing device which generates video data to send to said memory for storage said processing device also producing a processor request signal to request access to said memory;

a video control subsystem, for allocating access to said video memory, said video control subsystem comprising;

a first arbiter circuit, connected to receive said clock signal, which circuit is adapted to produce a first memory access interval assignment signal according to a predefined allocation sequence;

a second arbiter circuit, connected to receive said clock signal and said display request signal, which circuit is adapted to produce a second access interval assignment signal responsive to individual display controller request signals;

a first logic processor connected to said display controller to receive an indication of display mode, which logic processor selects as output one of said assignment signals respective of the display mode of said display controller; and a memory access controller, connected to said first logic processor to receive said selected assignment signal and to receive request signals from said display controller and said processing device, which allocates access intervals to said processing device and said display controller at least in part according to the selected assignment signal and transmits corresponding request to said memory.

2. A video control subsystem according to claim 1, for use in a computer system in which said memory has predefined storage addresses and said processing device and display controller produce request signals which include memory addresses, wherein said memory access controller is a multiplexer which receives memory addresses supplied by said display controller and said processing device in said request signals which are applied to said memory at least in part according to said selected assignment signal.

3. A video control subsystem according to claim 2 wherein:

a second logic processor receives said video enable signal(s) and in response thereto produces a display-active signal to indicate periods during which a portion of access intervals must be allocated to supply data to said display and said memory access controller includes a third logic processor, connected to said second logic processor, which enables said selected assignment signal in response to said display-active signal.

4. A video control subsystem according to claim 3 wherein:

said memory is of the type requiring intermittent refresh operations and said display controller includes means to set a refresh enable signal when refresh access to said memory is occurring and said third logic processor is further connected to receive said refresh enable signal and also enables said selected assignment signal in response to said refresh enable signal.

5. A video subsystem according to claim 1 wherein said display controller has a first mode of operation which has a first corresponding video data rate and a second mode with a lower data rate and said first logic processor selects said first memory access assignment signal in response to a mode signal indicating said first mode.

6. A video control subsystem according to claim 5 wherein said display controller produces memory address signals corresponding to a display request signal, said processing device produces memory address signals corresponding to processor request signals and said memory access controller is a multiplexer which receives such memory address signals from said display controller and from said processing device and selects which memory address signals are applied to said video memory at least in part according to said selected assignment signal.

* * * * *